US010189966B2

(12) United States Patent
Lee et al.

(10) Patent No.: US 10,189,966 B2
(45) Date of Patent: Jan. 29, 2019

(54) COMPOSITION FOR MANUFACTURING POLYURETHANE FOAM AND MOLDED ARTICLE THEREOF

(71) Applicants: Hyundai Motor Company, Seoul (KR); Kia Motors Corporation, Seoul (KR)

(72) Inventors: Sung Hyun Lee, Gyeonggi-do (KR); Kwon Yong Choi, Seoul (KR); Dong Uk Lee, Seoul (KR); Byung Guk Lim, Seoul (KR); Soon Joon Jung, Seoul (KR); Il Gon Lee, Gyeonggi-do (KR); Jae Beom Park, Jeollanam-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/283,191

(22) Filed: Sep. 30, 2016

(65) Prior Publication Data

US 2017/0292003 A1 Oct. 12, 2017

(30) Foreign Application Priority Data

Apr. 7, 2016 (KR) ........................ 10-2016-0042884

(51) Int. Cl.

| C08G 18/10 | (2006.01) |
|---|---|
| C08G 18/12 | (2006.01) |
| C08G 18/30 | (2006.01) |
| C08G 18/48 | (2006.01) |
| C08G 18/63 | (2006.01) |
| C08G 18/65 | (2006.01) |
| C08G 18/76 | (2006.01) |
| C08J 9/12 | (2006.01) |
| C08G 101/00 | (2006.01) |

(52) U.S. Cl.
CPC ............ *C08J 9/125* (2013.01); *C08G 18/12* (2013.01); *C08G 18/30* (2013.01); *C08G 18/4825* (2013.01); *C08G 18/632* (2013.01); *C08G 18/6552* (2013.01); *C08G 18/7621* (2013.01); *C08G 18/7657* (2013.01); *C08G 18/10* (2013.01); *C08G 2101/0058* (2013.01); *C08J 2203/10* (2013.01); *C08J 2375/04* (2013.01)

(58) Field of Classification Search
CPC ....................................... C08G 18/10
See application file for complete search history.

(56) References Cited

U.S. PATENT DOCUMENTS

| 6,077,456 A * | 6/2000 | Narayan ................ C08G 18/10 |
|---|---|---|
| | | 252/182.2 |
| 2013/0274364 A1* | 10/2013 | Battistini ........... C08G 18/7671 |
| | | 521/160 |

FOREIGN PATENT DOCUMENTS

| JP | 2005-124744 A | 5/2005 |
|---|---|---|
| JP | 2009-155380 A | 7/2009 |
| KR | 10-2002-0045568 A | 6/2002 |
| KR | 10-2003-0077643 A | 10/2003 |
| KR | 2005-0044274 A | 5/2005 |
| KR | 2010-0057794 A | 6/2010 |
| KR | 10-2010-0073713 A | 7/2010 |
| KR | 10-2012-0090708 A | 8/2012 |
| KR | 2013-0048057 A | 5/2013 |
| KR | 2013-0121867 A | 11/2013 |
| KR | 2015-0024464 A | 3/2015 |
| KR | 10-2015-0109936 A | 10/2015 |

* cited by examiner

*Primary Examiner* — Melissa A Rioja
(74) *Attorney, Agent, or Firm* — Mintz Levin Cohn Ferris Glovsky and Popeo, P.C.; Peter F. Corless

(57) ABSTRACT

Disclosed are a polyurethane composition, a molded article, and a vehicle comprising the polyurethane composition or the molded article. The polyurethane composition comprises a polyol composition (A) in which polyether polyol (a1) and polymer polyol (a2) are mixed at a predetermined amount, an isocyanate composition (B) obtainable by polymerizing polyether polyol (b2) and an isocyanate composition (b1) that comprises i) methylene diphenyl isocyanate (M-MDI) and ii) polymethylene diphenyl isocyanate (P-MDI). As such, the molded article such as a vehicle seat pad can be manufactured with improved static and dynamic comfort.

10 Claims, 3 Drawing Sheets

COMPOSITION FOR MANUFACTURING POLYURETHANE FOAM AND MOLDED ARTICLE THEREOF

CROSS-REFERENCE TO RELATED APPLICATION

This application claims under 35 U.S.C. § 119(a) the benefit of Korean Patent Application No. 10-2016-0042884 filed on Apr. 7, 2016, the entire contents of which are incorporated herein by reference.

TECHNICAL FIELD

The present invention relates to a polyurethane composition for manufacturing a vehicle seat pad with improved static and dynamic comfort. The composition may comprise a polyol composition A in which polyether polyol a1 and polymer polyol a2 are mixed at a predetermined amount, an isocyanate composition B obtainable by steps comprising polymerizing polyether polyol in an isocyanate mixture of methylene diphenyl diisocyanate (monomeric or M-MDI) and polymethylene-diphenyl diisocyanate (P-MDI) without using toluene diisocyanate. The composition may selectively comprise additives.

BACKGROUND

In the related art, hardness and other mechanical properties of a vehicle seat pad have been considered as important property factors relating to properties such as the shape of the seat and moldability together with an appearance. Further, in order to reduce vehicle manufacturing cost, a polyurethane seat pad has been produced by using a raw material which is cheap, has low density, and moldable, thereby substantially increasing productivity, but the ride comfort has been relatively decreased.

Main factors of the ride comfort may be measured as hysteresis loss that indicates support feeling of the seat pad when a driver sits on the seat pad and a vibration characteristic that indicates the ride comfort during driving. The ride comfort of the seat pad may be substantially improved by minimizing the hysteresis loss and improving the vibration characteristic.

Recently, due to the development of vehicle industry, requirements for vehicle performance to customers have been diversified, and the importance for the ride comfort of the seat pad among the requirements may be substantially increased. According to the demand of the customer, in the vehicle industry and polyurethane raw material manufacturers, raw materials for manufacturing the polyurethane seat pad capable of minimizing the hysteresis loss and improving the vibration characteristic have been developed. However, the raw material for manufacturing the convention polyurethane may be limited, and thus, compensation techniques for the limitation may be required.

Particularly, in a conventional polyurethane foam composition, as isocyanate, toluene diisocyanate, methylene diphenyl diisocyanate, and poly methylene diphenyl diisocyanate have been used, however ride comfort of the seat pad has not been sufficiently improved.

As a result, the development of the composition for manufacturing the automotive seat pad with more improved static and dynamic comfort is urgently required.

The above information disclosed in this Background section is only for enhancement of understanding of the background of the invention and therefore it may contain information that does not form the prior art that is already known in this country to a person of ordinary skill in the art.

SUMMARY

In preferred aspect, the present invention provides a composition for manufacturing a vehicle seat pad. The composition may be manufactured by using an isocyanate composition (B) polymerized with 1) polyether polyol having a weight average molecular weight in a predetermined range using methylene diphenyl isocyanate (M-MDI) and polymethylene diphenyl isocyanate (P-MDI) as isocyanate without using toluene diisocyanate, and a polyol composition (A) comprising polyether polyol (a1) having a weight average molecular weight and a value of OH as a specific condition and polymer polyol (a2). As consequence, the ride comfort of the seat pad during riding may be substantially improved by reducing hysteresis loss, a vibration transmission rate, a resonance frequency, and an insulation frequency to complete the present invention.

In one aspect of the present invention may provide a composition for manufacturing a polyurethane foam for manufacturing a vehicle seat pad with improved static and dynamic comfort. The composition may comprise: an amount of 100 parts by weight of polyol composition (A), an isocyanate composition (B).

The isocyanate composition (B) suitably may be obtainable by addition—polymerizing 1) an amount of about 1 to 5 parts by weight of polyether polyol (b2) with respect to 100 parts by weight of the polyol composition (a) and 2) an isocyanate composition (b1) including i) an amount of about 15 to 40 parts by weight of methylene diphenyl isocyanate (monomeric MDI or M-MDI) with respect to 100 parts by weight of the polyol composition A and ii) an amount of about 8 to 21 parts by weight of polymethylene diphenyl isocyanate (P-MDI) with respect to 100 parts by weight of the polyol composition A.

The composition may further include one or more additives selected from the group consisting of a cross-linking agent (C), a catalyst (D), a foam stabilizer (E), and a foaming agent (F).

Preferably, the composition may further include an amount of about 0.01 to 10 parts by weight of the cross-linking agent (C), an amount of about 0.01 to 3 parts by weight of the catalyst (D), an amount of about 0.01 to 3 parts by weight of the foam stabilizer (E), and an amount of about 1 to 5 parts by weight of the foaming agent (F), with respect to 100 parts by weight of the polyol composition (A).

The methylene diphenyl isocyanate (monomeric MDI or M-MDI) may have an NCO content of about 30 to 35 wt % based on the total weight of the methylene diphenyl isocyanate.

The polymethylene diphenyl isocyanate (P-MDI) has a weight average molecular weight in a range of about 370 to 390 g/mol and an NCO content of about 25 to 35 wt % based on the total weight of the polymethylene diphenyl isocyanate.

The term "NCO content" as used herein refers to an index which indicates weight or mole percent of NCO (N=C=O) group in isocyanate compounds. For example, those NCO group may react with hydroxyl (OH) in polyol to form a polyurethane. In certain embodiments of the present invention, the NCO content in isocyanate compounds can be presented in wt %.

Preferably, the polyol composition (A) may comprise: an amount of about 60 to 99 wt % of polyether polyol (a1); and an amount of about 1 to 40 wt % of grafted polymer polyol (a2') in which one or more monomers selected from the group consisting of acrylonitrile and styrene may be grafted to a polyether polyol having a weight average molecular weight of about 5,000 to 8,000 g/mol and a value of OH of about 20 to 35 mg KOH/g. All the wt % are based on the total weight of the polyol composition (A).

As referred herein, a "grafted" indicates to a segmented or branched on a polymer backbone structure, with one or more of distinct chemical groups (side chains) from the backbone structure. As used herein, the grated polymer may include additional side chains segmented or branched from backbone or main chain, the individual grafted chains may vary to implement desired properties to the main chain, for example, water compatibility, elasticity, hydrophobicity, heat resistance, thermosensitivity, antibacterial effect, or the like. Examples of the side chains grafted on the preferred polymer of the present invention may include acrylonitrile and styrene.

Alternatively, the polyol composition (A) may comprise: an amount of about 60 to 99 wt % of polyether polyol (a1); and an amount of 1 to 40 wt % of a mixture (a2") in which one or more monomers selected from the group consisting of acrylonitrile and styrene are dispersed in a polyether polyol having a weight average molecular weight of about 5,000 to 8,000 g/mol and a value of OH of about 20 to 35 mg KOH/g. All the wt % are based on the total weight of the polyol composition (A).

In particular, the polyether polyol (a1) may be obtainable by steps comprising polymerizing propylene oxide (PO) and ethylene oxide (EO) and may have a weight average molecular weight of about 6,000 to 8,000 g/mol and a value of OH of about 20 to 30 mg KOH/g. Preferably, the polyether polyol (a1) may comprise an amount of about 10 to 20 wt % of ethylene oxide (EO) and an amount of about 80 to 90 wt % of propylene oxide (PO), based on the total weight of the polyether polyol (a1).

The polyether polyol (b2) may be obtainable by steps comprising polymerizing propylene oxide and ethylene oxide, and suitably may have a weight average molecular weight of about 3,000 to 8,000 g/mol and a value of OH of about 20 to 60 mg KOH/g.

The term "a value of OH" as used herein refers to an index for a content of hydroxyl group (OH) in polyol polymers. For example, those OH group may react with a NCO (N=C=O) group in isocyanate composition to form a polyurethane. In certain embodiments of the present invention, the value of OH in the polyol polymers can be presented in a weight that may be provided in a form of KOH.

In another aspect, the present invention provides a molded article for a vehicle seat pad manufactured by using the composition for manufacturing the polyurethane foam as described herein.

Still further provided is a composition for manufacturing a polyurethane foam. The composition may comprise: an amount of 100 parts by weight of a polyol composition (A), an isocyanate composition (B). Preferably, the isocyanate composition (B) may comprise: 1) an amount of about 1 to 5 parts by weight of polyether polyol (b2) with respect to 100 parts by weight of the polyol composition (A) and 2) an isocyanate composition (b1) comprising, i) an amount of about 15 to 40 parts by weight of methylene diphenyl isocyanate (M-MDI) with respect to 100 parts by weight of the polyol composition (A) and ii) an amount of about 8 to 21 parts by weight of polymethylene diphenyl isocyanate (P-MDI) with respect to 100 parts by weight of the polyol composition (A).

The composition may further comprise: one or more additives selected from the group consisting of a cross-linking agent (C), a catalyst (D), a foam stabilizer (E), and a foaming agent (F). Preferably, the composition may further comprise an amount of about 0.01 to 10 parts by weight of the cross-linking agent (C), an amount of about 0.01 to 3 parts by weight of the catalyst (D), an amount of about 0.01 to 3 parts by weight of the foam stabilizer (E), and an amount of about 1 to 5 parts by weight of the foaming agent (F), with respect to 100 parts by weight of the polyol composition (A).

The methylene diphenyl isocyanate (M-MDI) suitably may have an NCO content of about 30 to 35 wt % based on the total weight of the methylene diphenyl isocyanate and the polymethylene diphenyl isocyanate (P-MDI) suitably may a weight average molecular weight in a range of about 370 to 390 g/mol and an NCO content of about 25 to 35 wt % based on the total weight of the polymethylene diphenyl isocyanate.

Preferably, the polyol composition (A) may comprise: an amount of about 60 to 99 wt % of polyether polyol (a1); and an amount of about 1 to 40 wt % of a grafted polymer polyol (a2') in which one or more monomers selected from the group consisting of acrylonitrile and styrene are grafted to a polyether polyol having a weight average molecular weight of 5,000 to 8,000 g/mol and a value of OH of 20 to 35 mg KOH/g, based on the total weight of the polyol composition (A). The polyether polyol (a1) suitably may comprise propylene oxide (PO) and ethylene oxide (EO), and has a weight average molecular weight of about 6,000 to 8,000 g/mol and a value of OH of about 20 to 30 mg KOH/g.

Alternatively, the polyol composition (A) may comprise: an amount of about 60 to 99 wt % of polyether polyol (a1); and an amount of 1 to 40 wt % of a mixture (a2") comprising one or more monomers selected from the group consisting of acrylonitrile and styrene dispersed in a polyether polyol having a weight average molecular weight of 5,000 to 8,000 g/mol and a value of OH of 20 to 35 mg KOH/g, with all the wt % based on the total weight of the polyol composition (A).

The polyether polyol (a1) suitably may comprise propylene oxide (PO) and ethylene oxide (EO), and has a weight average molecular weight of about 6,000 to 8,000 g/mol and a value of OH of 20 to 30 mg KOH/g.

Preferably, the polyether polyol (a1) may comprise an amount of about 10 to 20 wt % of ethylene oxide (EO) and an amount of about 80 to 90 wt % of propylene oxide (PO), all the wt % based on the total weight of the polyether polyol (a1).

Preferably, the polyether polyol (b2) may comprise propylene oxide and ethylene oxide, and has a weight average molecular weight of about 3,000 to 8,000 g/mol and a value of OH of about 20 to 60 mg KOH/g.

Further provided is a vehicle that may comprise the composition as described herein.

According to various exemplary embodiments of the present invention, a seat may have improved comfort by maintaining hysteresis loss using the composition for manufacturing the polyurethane foam. For example, the hysteresis loss may be about 20% or less. In addition, the ride comfort may be substantially improved by reducing a vibration transmission rate among the vibration characteristics to about 3.0 or less and the insulation frequency and the resonance frequency may be substantially reduced as compared with the conventional seat pad to minimize vibration generated from a road surface and the automobile during driving.

Furthermore, since the conventional seat pad has a large surface thickness and roughness, when the seat pad is mounted on a frame, due to the friction between the frame and the seat pad, a noise phenomenon may occur. In order to prevent the noise, an anti-noise agent has been coated on the back of the seat pad. In contrast, the seat pad manufactured by the present invention may be soft and moist, the noise may be reduced and the use amount of the anti-noise agent may be substantially reduced.

In addition, the conventional seat pad has included specific isocyanate which is mixed in an amount of 20 to 30 wt % of toluene diisocyanate for improving a foaming rate. In that case, curing of the foam may be slow and thus, the foam is removed from the mold at a temperature of 55 to 65° C. in approximately 5 minutes. However, in the molded product using the composition of the present invention, curing may be improved and thus, the foam may be removed in about 3 to 4 minutes thereby substantially reducing a removing time. As a result, a production amount of the seat pad may be increased for the same time.

In other words, the present invention may provide advantages of maximizing the ride comfort of a driver and a passenger by improving a comfort function of the automotive seat pad, maintaining the texture of the seat pad to be moist and soft, and of increasing the productivity.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1A:
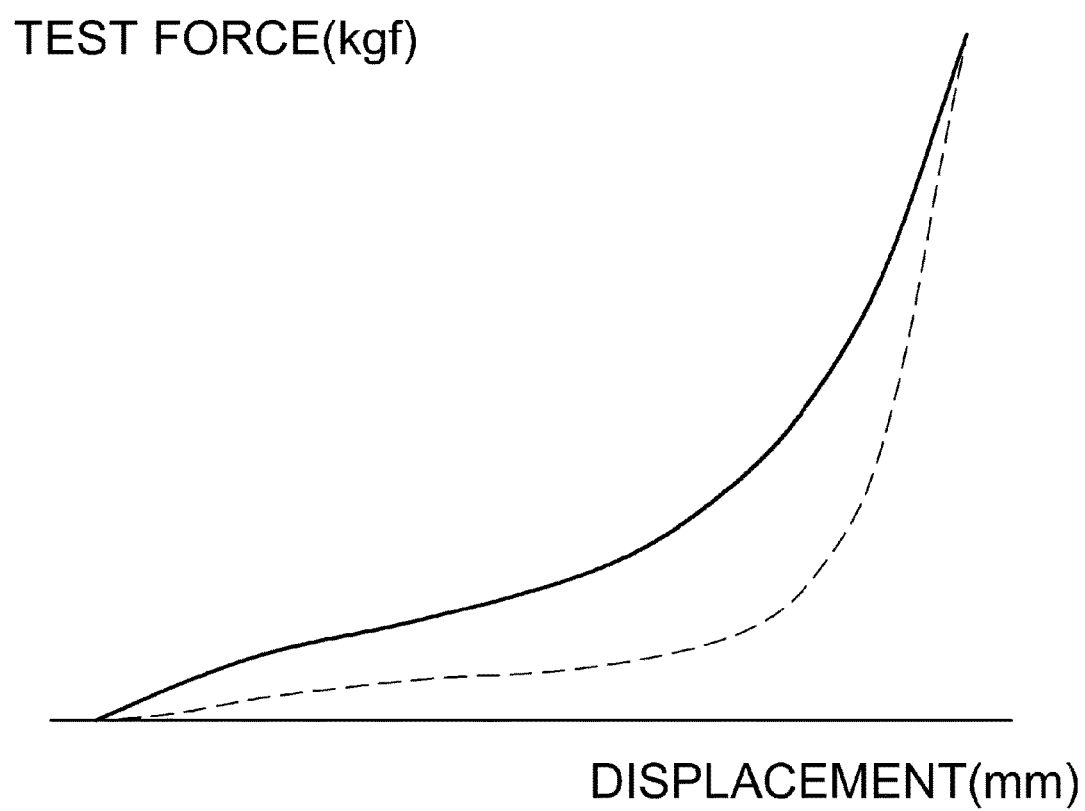
FIGS. 1A and 1B illustrate exemplary hysteresis loss curves of Comparative Examples 1A and 6B.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in more detail as an exemplary embodiment.

The present invention provides a composition of a polyurethane foam. The composition may comprise: an amount of 100 parts by weight of polyol composition A, an isocyanate composition B. The isocyanate composition B may be obtainable by steps comprising polymerizing a) an amount of about 1 to 5 parts by weight of polyether polyol b2 with 2) an isocyanate composition b1 including i) an amount of about 15 to 40 parts by weight of methylene diphenyl isocyanate (M-MDI) with respect to 100 parts by weight of the polyol composition A and ii) an amount of about 8 to 21 parts by weight of polymethylene diphenyl isocyanate (P-MDI) with respect to 100 parts by weight of the polyol composition A.

The composition of the present invention may further comprise one or more additives selected from the group consisting of a cross-linking agent (C), a catalyst (D), a foam stabilizer (E), and a foaming agent (F). Preferably, the composition may further include an amount of about 0.01 to 10 parts by weight of the cross-linking agent (C), an amount of about 0.01 to 3 parts by weight of the catalyst (D), an amount of about 0.01 to 3 parts by weight of the foam stabilizer (E), and an amount of about 1 to 5 parts by weight of the foaming agent (F) with respect to the entire weight of the polyol composition (A).

Hereinafter, each component will be described below in detail.

Preferably, the polyol composition A may be a mixture of: polyether polyol (a1) having a weight average molecular weight of 6,000 to 8,000 g/mol and a value of OH of 20 to 30 mg KOH/g and a grafted polymer polyol (a2') in which one or more monomers selected from the group consisting of acrylonitrile and styrene monomers are grafted to a polyether polyol having a weight average molecular weight of about 5,000 to 8,000 g/mol and a value of OH of about 20 to 35 mg KOH/g.

Alternatively, the polyol composition A may be a mixture of polyether polyol (a1) having a weight average molecular weight of 6,000 to 8,000 g/mol and a value of OH of 20 to 30 mg KOH/g and a mixture (a2") in which one or more monomers selected from the group consisting of acrylonitrile and styrene monomers are dispersed in a polyether polyol having a weight average molecular weight of about 5,000 to 8,000 g/mol and a value of OH of about 20 to 35 mg KOH/g.

Preferably, the polyether polyol a1 may be obtainable by steps comprising addition-polymerizing propylene oxide (PO) and ethylene oxide (EO) and thus obtained polyether polyol a1 may have a weight average molecular weight of about 6,000 to 8,000 g/mol and a value of OH of about 20 to 30 mg KOH/g. When the weight average molecular weight of the polyether polyol a1 is less than about 6,000 g/mol or the value of OH of the polyether polyol a1 is greater than about 30, hysteresis loss may substantially deteriorate and a collapse defect in which the foam is dented when manufacturing the seat pad may occur. When the weight average molecular weight of the polyether polyol a1 is greater than about 8,000 g/mol or the value of OH of the polyether polyol a1 is less than about 20, a shrinkage defect of the seat pad may occur due to a difference in pressure between the inside and the outside. Accordingly, it is preferred that the polyether polyol a1 has the properties in the range as described above.

Preferably, the polyether polyol a1 may include an amount of about 10 to 20 wt % of the ethylene oxide (EO) and an amount of about 80 to 90 wt % of the propylene oxide (PO) based on the total weight of the polyether polyol a1. When the ethylene oxide is less than about 10 wt % or greater than about 20 wt %, a molding defect occurs due to depression and shrinkage of the foam during foaming.

A polymerization initiator may be used in the addition-polymerization reaction and suitably may be one or more selected from the group consisting of ethylene glycol, glycerine, triethanol amine, pentaerythritol, toluene diamine, ethylenediamine, 4,4'-diaminodiphenylmethane, sorbitol, and sucrose.

Preferably, the polyether polyol a1 may be included in an amount of about 60 to 99 wt % with respect to the total weight of the polyol composition A, or particularly of about 85 to 95 wt %. When the polyether polyol a1 is less than about 60 wt %, the hardness of the seat pad may be increased and thus, the hysteresis loss and vibration transmissibility performance may be substantially decreased. When the amount of the polyether polyol a1 is greater than about 99 wt %, the hardness of the seat pad may be substantially reduced and thus, there may not be no marketability. Accordingly, it is preferred that the polyether polyol a1 may be used in the range as described above.

The polymer polyol a2" may be a mixture in which one or more monomers selected from the group consisting of acrylonitrile and styrene is dispersed in polyether polyol having a weight average molecular weight of 5,000 to 8,000 g/mol and a value of OH of 20 to 35 mg KOH/g. Alternatively, the polymer polyol a2' may be a grafted polymer polyol in which one or more monomers selected from the group consisting of acrylonitrile and styrene are grafted in polyether polyol having a weight average molecular weight of 5,000 to 8,000 g/mol and a value of OH of 20 to 35 mg KOH/g. Preferably, the polymer polyol a2 may be included in an amount of about 1 to 40 wt % with respect to the total weight of the polyol composition A, and or particularly in an amount of about 5 to 15 wt % with respect to the total weight of the polyol composition A.

When the weight average molecular weight of the polyether polyol is less than about 5,000 g/mol or the value of OH is less than about 20, the hysteresis loss may be substantially decreased. When the weight average molecular weight of the polyether polyol is greater than about 8,000 g/mol or the value of OH is greater than about 35, the shrinkage defect of the seat pad may occur due to the difference in internal and external pressure. Accordingly, it is preferred that the polyether polyol is used in the range defined above.

When the polymer polyol a2 is less than about 1 wt % with respect to the total weight of the polyol composition A, the hardness of the seat pad may be substantially decreased and thus, there is no marketability. When the polymer polyol a2 is greater than about 40 wt %, the hardness of the seat pad may be substantially increase and thus, the hysteresis loss and vibration transmissibility performance may be substantially decreased. Accordingly, it is preferred that the polymer polyol a2 is include in the polyol composition A in the range as described above.

The isocyanate composition B may include methylene diphenyl isocyanate (M-MDI) and polymethylene diphenyl isocyanate (P-MDI) without using toluene diisocyanate. The isocyanate composition B may be obtained by addition-polymerizing polyether polyol having a weight average molecular weight of about 3,000 to 8,000 g/mol with the isocyanate mixture (M-MDI and P-MDI).

Preferably, the methylene diphenyl isocyanate (M-MDI) may have a NCO (N=C=O) content in an amount of about 30 to 35 wt % based on the total weight of the M-MDI. When the NCO content is less than about 30 wt %, the density of the seat pad may be substantially increased due to low urethane foaming rate and thus, the fuel efficiency may be decreased. When the NCO content is greater than about 35 wt %, the density of the seat pad may be substantially decreased and thus, durability of the seat pad may be decreased. Accordingly, the NCO content of the M-MDI may be in the range as described above.

Preferably, the polymethylene diphenyl isocyanate (P-MDI) may have a weight average molecular weight in a range of about 370 to 390 g/mol and the NCO content may be in an amount of about 25 to 35 wt % based on the total weight of the P-MDI. When the weight average molecular weight is less than about 370 g/mol, tear strength and elongation among mechanical properties of the seat pad may be decreased, and when the weight average molecular weight is greater than about 390 g/mol, tensile strength of the seat pad may be deceased. When the NCO content is less than about 25 wt %, the density of the seat pad may be substantially increased due to low urethane foaming rate and thus, the fuel efficiency may be decreased. When the NCO content is greater than about 35 wt %, the density of the seat pad may be substantially decreased and thus, durability of the seat pad may be decreased. Accordingly, the polymethylene diphenyl isocyanate may have properties in the ranges as described above.

Particularly, the isocyanate composition B may be obtainable by steps comprising addition-polymerizing a) an amount of about 1 to 5 parts by weight of polyether polyol b2 having a weight average molecular weight of about 3,000 to 8,000 g/mol with 2) the isocyanate mixture b1. The isocyanate mixture b1 may include i) an amount of about 15 to 40 parts by weight of methylene diphenyl isocyanate (M-MDI) with respect to 100 parts by weight of the polyol composition A and ii) an amount of about 8 to 21 parts by weight of polymethylene diphenyl isocyanate (P-MDI) with respect to 100 parts by weight of the polyol composition A.

Preferably, in the isocyanate compound, a mixed amount ratio between methylene diphenyl isocyanate (M-MDI): polymethylene diphenyl isocyanate (P-MDI):polyether polyol may be of about 30 to 80 wt %:20 to 45 wt %:1 to 30 wt %, or particularly of about 40 to 65 wt %:30 to 40 wt %:2 to 7 wt %. When the content of the polyether polyol is less than the predetermined range, an adding effect may be substantially reduced, and when the content is greater than the predetermined range, the hardness of the foam and productivity may be substantially decreased and thus, the mixed amount ratio in the range as described above is preferable.

Preferably, the polyether polyol b2 used in manufacturing the isocyanate composition B may be obtainable by steps comprising addition-polymerizing propylene oxide and ethylene oxide. In addition, the polyether polyol b2 may have a weight average molecular weight of about 3,000 to 8,000 g/mol and a value of OH of about 20 to 60 mg KOH/g. When the weight average molecular weight of the polyether polyol b2 is less than about 3,000 g/mol or the value of OH of the polyether polyol b2 is greater than about 60 mg KOH/g, the hysteresis loss and vibration transmissibility performance may be substantially decreased, and when the weight average molecular weight of the polyether polyol b2 is greater than about 8,000 g/mol or the value of OH of the polyether polyol b2 is less than about 20 mg KOH/g, deformation of the shape of the seat pad may occur due to a difference between internal and external pressure. Accordingly, the polyether polyol b2 may have those properties in the ranges as described above. For reference, the polyether polyol used when manufacturing the isocyanate composition may be different from the polyether polyol a1 included in the polyol composition A.

As described above, the composition of the present invention may further include one or more additive selected from the group consisting of a cross-linking agent (C), a catalyst (D), a foam stabilizer $\epsilon$, and a foaming agent (F). Preferably, the additive may be mainly included in the polyol composition and then included in the composition during a reaction in general, or alternatively, the additive may be included and then mixed in isocyanate or the foaming agent.

Particularly, the cross-linking agent (C) as used herein may be glycol-based or amine-based, and be selected from the group consisting of ethylene glycol, diethylene glycol, triethylene glycol, dipropylene glycol, 1,4-butanediol, 1,6-hexanediol, pentaerythritol, diethanolamine, triethanol amine, ethylene diamine, triethylene tetraamine, methylene-ortho-chloroaniline, 4,4-diphenylmethane diamine, 2,6-dichloro-4,4-diphenylmethane diamine, 2,4-toluene diamine, and 2,6-toluene diamine, but examples thereof may not be necessarily limited thereto.

The cross-linking agent may increase cross-linked binding force between molecules to improve general properties such as tensile and shear, and simultaneously increase hydrolysis resistance to maintain a characteristic of the product under high temperature and humidity conditions. However, the cross-linking agent may be required in the amount only to satisfy the characteristic of the final product, because productivity may deteriorate due to problems such as closed cells and flowability.

Preferably, the cross-linking agent may be used in an amount of about 0.01 to 10 parts by weight with respect to 100 parts by weight of polyol, and or particularly of about 0.01 to 5 parts by weight. When the cross-linking agent is less than about 0.01 part by weight, an effect may be substantially reduced, and when the cross-linking agent is greater than about 10 parts by weight, flowability may deteriorate and thus, a molding defect rate may be substantially increased. Accordingly, the cross-linking agent may be used in the range as described above.

The catalyst D may include a general catalyst used in manufacturing a polyurethane foaming body and may not particularly limited. The catalyst may include an amine catalyst that may be selected from the group consisting of triethylenediamine, bis-diethylamino-ethyl ether, tripropylamine, triisopropanolamine, tributylamine, triethylamine, N-methylmorpholine, diethylene triaminebis (2-(N,N-diethylamino)ethyl)ether, and salts thereof.

The catalyst may be used in an amount of about 0.01 to 3 parts by weight with respect to 100 parts by weight of polyol. When the catalyst is less than about 0.01 parts by weight, curability and polymerization may be substantially reduced and thus, the productivity may be substantially decreased. When the catalyst is included greater than about 3 parts by weight, a defect rate may be substantially increased due to deterioration of flowability according to an initial curability increase. Accordingly, the catalyst may be used in the range as described above.

The foam stabilizer (E) as used herein may promote inter-reactivity by reducing emulsification between materials and surface tension, and may include a foam stabilizer that is generally used in manufacturing the polyurethane foaming body. Exemplary foam stabilizer may include, but not limited thereto, an organosilicon surfactant.

The foam stabilizer may be used in an amount of about 0.01 to 3 parts by weight with respect to 100 parts by weight of polyol. When the foam stabilizer is less than about 0.01 parts by weight, the foam may not be produced by phase separation between materials, and when the foam stabilizer is used greater than about 3 parts by weight, productivity may substantially deteriorate by excessively generating the closed cells. Preferably, the foam stabilizer may be used in the range as described above.

The foaming agent (F) may include water, or the foaming agent F may include freon-based (CFC, HCFC, and HFC), pentane-based (cyclopentane) compounds that may be general physical foaming agents. However, the freon-based foaming agent may suitably not be used due to global regulation to prevent destroys of ozone layer, and the pentane-based foaming agent may require significant investments for preventing explosion due to explosive property that is with a small amount in air.

Preferably, the foaming agent may be used in an amount of about 1 to 5 parts by weight with respect to 100 parts by weight of the polyol composition. When the foaming agent is included in an amount less than about 1 part by weight, a non-molding problem due to foaming deterioration may occur and the density quality may be decreased. When the foaming agent is included in an amount greater than about 5 parts by weight, the properties may substantially deteriorate due to excessive foaming.

The resin composition of the present invention may additionally include one or more additives selected from the group consisting of stabilizers, fillers, colorants, flame retardants, and antimicrobial agents if necessary, in addition to the main components.

The composition for manufacturing the polyurethane foam according to various exemplary embodiments of the present invention may reduce hysteresis loss which is an index of static comfort with respect to a vehicle seat pad having a density range of about 50 to 80 kg/m³ and reduce a vibration transmission rate, a resonance frequency, and an insulation frequency to substantially improve static and dynamic comfort as compared with a conventional seat pad. Accordingly, the composition of the present invention may be provided in a polyurethane foam for the vehicle seat pad with improved ride comfort.

Hereinafter, the present invention will be described in more detail with reference to Examples. However, the following Examples are to just exemplify the present invention and the scope of the present invention is not limited to Examples.

EXAMPLES

The following examples illustrate the invention and are not intended to limit the same.

Comparative Examples 1 to 15

An isocyanate composition was manufactured according to components and content ratios of the following Tables 1 to 3. Thereafter, the isocyanate composition was mixed and stirred with a polyol composition, reacted, and injected into an aluminum square mold (400×400×100 mm³) which was heated to a temperature of 60° C. After 4 minutes, the mold was removed to manufacture a polyurethane foam.

Example 1

A polyurethane foam was manufactured by the same method as Comparative Examples 1 to 15 according to a composition ratio of the following Table 3.

TABLE 1

Composition for manufacturing polyurethane foam (unit: part by weight)

| Classification | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Isocyanate compound | M-MDI #1) | 27.5 | 31.5 | 29.4 | 31.5 | 27.3 | 23.1 | 18.9 |
| | P-MDI #2) | 12.5 | 10.5 | 10.5 | 8.4 | 12.6 | 16.8 | 21.0 |
| | TDI #3) | 10 | — | — | — | — | — | — |
| | Polyol A #4) | — | — | 2.1 | 2.1 | 2.1 | 2.1 | 2.1 |
| Polyol composition | Polyol composition A #5) | 100 | — | — | — | — | — | — |
| | Polyol composition B #6) | — | 100 | 100 | 100 | 100 | 100 | 100 |

1) Methylene Diphenyl diisocyanate, NCO %: 33.5 wt %
2) Polymethylene Diphenyl diisocyanate, NCO %: 31.0 wt %
3) Toluene diisocyanate, NCO %: 48.3 wt %
4) Polyether polyol (weight average molecular weight of 3,000) obtained by using glycerin as initiator and addition-polymerizing propylene oxide and ethylene oxide
5) Product of KPX chemical corporation, polyol composition for manufacturing automotive seat pad (product name: MBR-660)
6) Product of Kumho Mitsui Chemicals corporation, polyol composition for manufacturing automotive seat pad (product name: RP-3000)

TABLE 2

Composition for manufacturing polyurethane foam (unit: part by weight)

| Classification | | Comparative Example 8 | Comparative Example 9 | Comparative Example 10 | Comparative Example 11 |
|---|---|---|---|---|---|
| Isocyanate composition (B) | M-MDI | 27.3 | 27.3 | 27.3 | 27.3 |
| | P-MDI | 12.6 | 12.6 | 12.6 | 12.6 |
| | Polyol B #7) | 2.1 | — | — | — |
| | Polyol C #8) | — | 2.1 | — | — |
| | Polyol D #9) | — | — | 2.1 | — |
| | Polyol E #10) | — | — | — | 2.1 |
| Polyol composition | Polyol composition B | 100 | 100 | 100 | 100 |

7) Polyether polyol (weight average molecular weight of 2,000) obtained by using glycerin as initiator and addition-polymerizing propylene oxide and ethylene oxide
8) Polyether polyol (weight average molecular weight of 5,000) obtained by using glycerin as initiator and addition-polymerizing propylene oxide and ethylene oxide
9) Polyether polyol (weight average molecular weight of 6,000) obtained by using glycerin as initiator and addition-polymerizing propylene oxide and ethylene oxide
10) Polyether polyol (weight average molecular weight of 8,000) obtained by using glycerin as initiator and addition-polymerizing propylene oxide and ethylene oxide

TABLE 3

Composition for manufacturing polyurethane foam (unit: part by weight)

| Classification | | Comparative Example 12 | Comparative Example 13 | Comparative Example 14 | Comparative Example 15 | Example 1 |
|---|---|---|---|---|---|---|
| Isocyanate composition | M-MDI | 27.3 | 27.3 | 27.3 | 27.3 | 27.3 |
| | P-MDI | 12.6 | 12.6 | 12.6 | 12.6 | 12.6 |

TABLE 3-continued

Composition for manufacturing polyurethane foam (unit: part by weight)

| Classification | | Comparative Example 12 | Comparative Example 13 | Comparative Example 14 | Comparative Example 15 | Example 1 |
|---|---|---|---|---|---|---|
| #11) Polyol composition | Polyol E | 2.1 | 2.1 | 2.1 | 2.1 | 2.1 |
| | Polyol F #12) | 100 | — | — | — | — |
| | Polyol G #13) | — | 100 | — | — | — |
| | Polyol H #14) | — | — | 100 | — | — |
| | Polyol I #15) | — | — | — | 100 | 90 |
| | Polyol J #16) | — | — | — | — | 10 |
| Additives | Cross-linking agent (C) #17) | 1.0 | 1.0 | 1.0 | 1.0 | 1.0 |
| | Catalyst (D) #18) | 1.0 | 1.0 | 1.0 | 1.0 | 1.0 |
| | Foam stabilizer (E) #19) | 0.8 | 0.8 | 0.8 | 0.8 | 0.8 |
| | Foaming agent (F) #20) | 3.0 | 3.0 | 3.0 | 3.0 | 3.0 |

11) NCO % 29.0, Product (product name: COSMONATE CG-3000) of Kumho Mitsui Chemicals corporation, isocyanate composition corresponding to the present invention.
12) Polyether polyol (weight average molecular weight of 4,000) obtained by using glycerin as initiator and addition-polymerizing propylene oxide and ethylene oxide
13) Polyether polyol (weight average molecular weight of 6,000) obtained by using glycerin as initiator and addition-polymerizing propylene oxide and ethylene oxide
14) Polyether polyol (weight average molecular weight of 6,500) obtained by using glycerin as initiator and addition-polymerizing propylene oxide and ethylene oxide
15) Polyether polyol (weight average molecular weight of 7,500) obtained by using glycerin as initiator and addition-polymerizing propylene oxide and ethylene oxide
16) Polymer polyol manufactured by dispersing acrylonitrile and styrene monomer in poly ether polyol having weight average molecular weight of 6,500 obtained by using glycerin as initiator and addition-polymerizing propylene oxide and ethylene oxide
17) Diethanol amine
18) Amine catalyst (product of Air Products Co. Ltd.)
19) Organosilicon surfactant (product of Momentive Corp.)
20) Distilled water or ion-exchanged water Test Examples Measurement of Properties With respect to the polyurethane foams manufactured in Comparative Examples 1 to 15 and Example 1, after 24 hours, the density, hardness, hysteresis loss, a resonance frequency, a vibration transmission rate, and an insulation frequency of the foam were measured, and results of the properties were listed in the following Tables 4 to 6. Test methods thereof were as follows.

(1) Specific gravity: The specific gravity was measured by ASTM D3574-05 TEST A.

(2) Hardness: The hardness was measured by ASTM D3574-05 TEST B.

(3) Hysteresis loss: The hysteresis loss was measured by ASTM D3574-05 TEST X6. The measured hysteresis loss may indicate that static comfort is increased as the measured value is decreased.

(4) Maximum vibration transmission rate/resonance frequency/insulation frequency: The maximum vibration transmission rate/resonance frequency/insulation frequency were measured by MS200-34 section 4.8. The measured value may indicate that as the measured value is decreased, the seat pad absorbs vibration transferred from an automobile and minimizes a specific frequency which lowers comfort by the automotive vibration during driving to improve the dynamic comfort.

TABLE 4

Property measurement result 1

| Classification | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Density (kg/m$^3$) | | 55.1 | 65.2 | 65.1 | 65.0 | 64.8 | 65.0 | 65.0 |
| Hardness (kgf/314 cm$^2$) | | 24.3 | 24.1 | 23.9 | 24.5 | 24.3 | 23.8 | 24.2 |
| Hysteresis loss (%) | | 26.5 | 22.3 | 21.1 | 22.5 | 17.8 | 17.1 | 22.6 |
| Vibration characteristic | Maximum vibration transmission rate (A/A0) | 4.87 | 3.45 | 3.23 | 3.51 | 3.20 | 3.14 | 3.42 |
| | Resonance frequency (Hz) | 4.99 | 4.47 | 4.44 | 4.45 | 4.23 | 4.05 | 4.46 |

TABLE 4-continued

| | Property measurement result 1 | | | | | | |
|---|---|---|---|---|---|---|---|
| Classification | Comparative Example 1 | Comparative Example 2 | Comparative Example 3 | Comparative Example 4 | Comparative Example 5 | Comparative Example 6 | Comparative Example 7 |
| Insulation frequency (Hz, A/A0 = 1) | 7.45 | 6.99 | 6.74 | 6.96 | 6.24 | 6.01 | 6.94 |

As shown in the result of Table 4, in Comparative Example 1, it could be seen that toluene diisocyanate was included in the amount of 10 parts by weight as the polyurethane foam manufactured by isocyanate for manufacturing a conventional vehicle seat pad, and hysteresis loss and a vibration characteristic were substantially reduced as compared with Example.

Meanwhile, in Comparative Example 2, it could be seen that the hysteresis loss and the vibration characteristic simultaneously were improved without adding toluene diisocyanate into the isocyanate compound.

In Comparative Example 3, as compared with Comparative Example 1, it could be seen that the hysteresis loss and the vibration characteristic were further improved by using the compound obtained by adding a predetermined amount of polyether polyol in the isocyanate composition without adding toluene diisocyanate to the isocyanate compound.

In Comparative Examples 4 to 7, as compared with Comparative Example 3, it could be seen that the content of polymethylene diisocyanate (P-MDI) was increased and the hysteresis loss and the vibration characteristic were further improved. Comparative Example 6 using 16.8 parts by weight of polymethylene diisocyanate (P-MDI) with respect to 100 parts by weight of the polyol composition was best, and in Comparative Example 4 (8.4 parts by weight) and Comparative Example 7 (21 parts by weight), it was confirmed that a difference in effect therefrom was not relatively large.

Figure 1B:
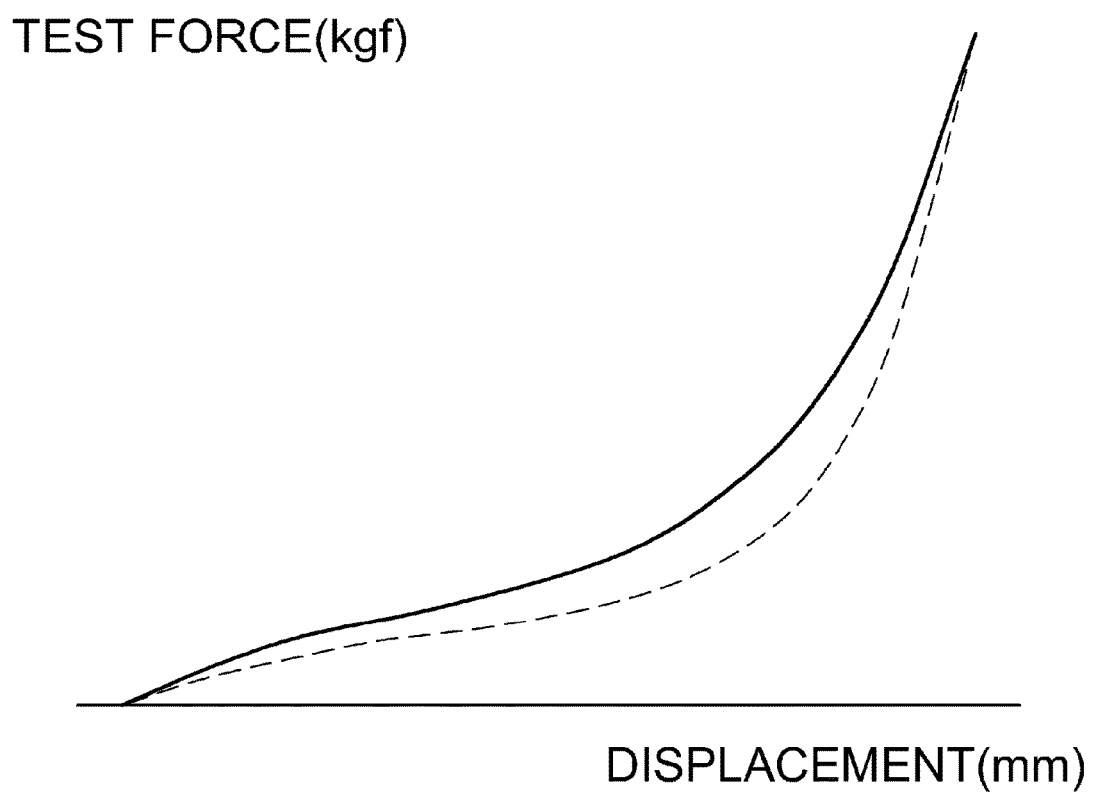

FIGS. 1A and 1B show hysteresis loss curves of Comparative Example 1A and Comparative Example 6B in comparison. As a result, it can be seen that in the case of using only methylene diphenyl isocyanate (M-MDI) and polymethylene diphenyl diisocyanate (P-MDI) as isocyanate without using toluene diisocyanate, the static and dynamic comfort was improved.

As a result, through Comparative Examples 1 to 7, it was confirmed that in the case of manufacturing the polyurethane foam by using isocyanate including a predetermined amount of polymethylene diisocyanate without using toluene diisocyanate, the hysteresis loss and the vibration characteristic were improved.

TABLE 5

| | Property measurement result 2 | | | |
|---|---|---|---|---|
| Classification | Comparative Example 8 | Comparative Example 9 | Comparative Example 10 | Comparative Example 11 |
| Density (kg/m$^3$) | 65.4 | 65.0 | 65.2 | 65.1 |
| Hardness (kgf/314 cm$^2$) | 25.3 | 24.9 | 24.8 | 24.9 |
| Hysteresis loss (%) | 19.0 | 17.3 | 17.1 | 16.9 |
| Vibration characteristic Maximum vibration transmission rate (A/A0) | 3.24 | 3.20 | 3.18 | 3.10 |
| Resonance frequency (Hz) | 4.28 | 4.18 | 4.05 | 4.01 |
| Insulation frequency (Hz, A/A0 = 1) | 6.55 | 6.36 | 6.26 | 6.01 |

As shown in the result of Table 5, in the case of Comparative Examples 8 to 11, as compared with Comparative Example 5, in the isocyanate compound, polyether polyols having large and small molecular weights were used. In Comparative Example 8 (molecular weight of 2,000), there was almost no effect, and in Comparative Example 9 (molecular weight of 5,000), as compared with Comparative Examples 10 and 11, the effect was relatively decreased. For reference, commercialized polyether polyol having a molecular weight of 9,000 or greater was not found.

As a result, through Comparative Examples 8 to 11, in the case of the polyether polyol used when manufacturing the isocyanate compound, it was confirmed that the hysteresis loss and the vibration characteristic were improved when the weight average molecular weight was greater than 2,000 g/mol. Accordingly, it is preferred that the isocyanate composition was manufactured by using polyether polyol having a weight average molecular weight of 3,000 to 8,000 g/mol.

TABLE 6

Property measurement result 3

| Classification | | Comparative Example 12 | Comparative Example 13 | Comparative Example 14 | Comparative Example 15 | Example 1 |
|---|---|---|---|---|---|---|
| Density (kg/m$^3$) | | 64.6 | 64.8 | 65.0 | 64.7 | 65.1 |
| Hardness (kgf/314 cm$^2$) | | 24.7 | 24.6 | 24.7 | 24.4 | 24.2 |
| Hysteresis loss (%) | | 20.9 | 18.5 | 17.8 | 16.9 | 16.1 |
| Vibration characteristic | Maximum vibration transmission rate (A/A0) | 4.82 | 4.27 | 3.89 | 2.87 | 2.80 |
| | Resonance frequency (Hz) | 5.55 | 4.76 | 4.23 | 3.87 | 3.53 |
| | Insulation frequency (Hz, A/A0 = 1) | 7.32 | 6.87 | 6.76 | 5.99 | 5.74 |

As shown in the result of Table 6, in the case of Comparative Examples 12 to 15, it could be seen that static and dynamic comfort was improved as the molecular weight of the polyether polyol was increased in the polyol composition, but the effect was substantially decreased and in Comparative Example 12 (molecular weight of 4,000), the effect was decreased the most.

However, in the case of Example 1 using the polyol composition including polyether polyol and polymer polyol with a predetermined amount according to the present invention, it could be seen that the effect was most excellent.

Figure 2:
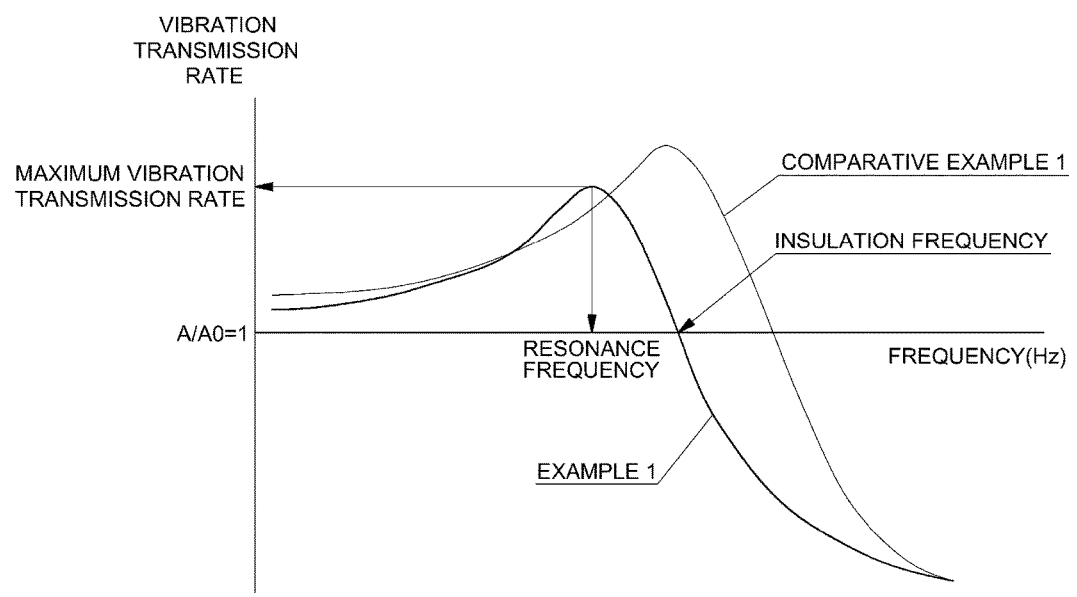
FIG. 2 illustrates exemplary curves of comparing vibration characteristics of Comparative Example 1 and Example 1.

FIG. 2 illustrates a curve comparing variation characteristics of Comparative Example 1 and Example 1. In the case of Example 1 using polyether polyol and polymer polyol as the polyol composition, it can be seen that the static and dynamic comfort was substantially improved.

As described above, it could be seen that the polypropylene resin composition of Example 1 according to the present invention may reduce the hysteresis loss, the vibration transmission rate, the resonance frequency, and the insulation frequency by using appropriately the respective components to improve the ride comfort of the seat pad in vehicle riding.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A composition for manufacturing a polyurethane foam, comprising:
    an amount of 100 parts by weight of a polyol composition (A),
    an isocyanate composition (B)
    wherein the isocyanate composition (B) is obtainable by a step comprising polymerizing 1) an amount of about 1 to 5 parts by weight of polyether polyol (b2) with respect to 100 parts by weight of the polyol composition (A) and 2) an isocyanate composition (b1) that comprises i) an amount of about 15 to 40 parts by weight of methylene diphenyl isocyanate (M-MDI) with respect to 100 parts by weight of the polyol composition (A), and ii) an amount of about 8 to 21 parts by weight of polymethylene diphenyl isocyanate (P-MDI) with respect to 100 parts by weight of the polyol composition (A),
    wherein, based on the total weight of polyol composition (A), polyol composition (A) comprises:
    an amount of about 85 to 95 wt % of a polyether polyol (a1); and
    an amount of 5 to 15 wt % of a mixture (a2") comprising one or more monomers selected from the group consisting of acrylonitrile and styrene dispersed in a polyether polyol having a weight average molecular weight of 5,000 to 8,000 g/mol and a OH value of 25 to 35 mg KOH/g, and
    wherein the polyether polyol (a1) is obtainable by steps comprising polymerizing propylene oxide (PO) and ethylene oxide (EO), and has a weight average molecular weight of about 6,000 to 8,000 g/mol and a OH value of 20 to 30 mg KOH/g.

2. The composition for manufacturing a polyurethane foam of claim 1, further comprising, with respect to 100 parts by weight of the polyol composition (A):
    one or more additives selected from the group consisting of a cross-linking agent (C) in an amount of about 0.01 to 10 parts by weight, a catalyst (D) in an amount of about 0.01 to 3 parts by weight, a foam stabilizer (E) in an amount of about 0.01 to 3 parts by weight, and a foaming agent (F) in an amount of about 1 to 5 parts by weight, all the parts by weight are with respect to 100 parts by weight of the polyol composition (A).

3. The composition for manufacturing a polyurethane foam of claim 1, wherein the methylene diphenyl isocyanate (M-MDI) has an NCO content of about 30 to 35 wt % based on the total weight of the methylene diphenyl isocyanate.

4. The composition for manufacturing a polyurethane foam of claim 1, wherein the polymethylene diphenyl isocyanate (P-MDI) has a weight average molecular weight in a range of about 370 to 390 g/mol and an NCO content of about 25 to 35 wt % based on the total weight of the polymethylene diphenyl isocyanate.

5. The composition for manufacturing a polyurethane foam of claim 2, wherein the polyether polyol (a1) comprises an amount of about 10 to 20 wt % of ethylene oxide (EO) and an amount of about 80 to 90 wt % of propylene oxide (PO), all the wt % based on the total weight of the polyether polyol (a1).

6. The composition for manufacturing a polyurethane foam of claim 1, wherein the polyether polyol (a1) comprises an amount of about 10 to 20 wt % of ethylene oxide (EO) and an amount of about 80 to 90 wt % of propylene oxide (PO), all the wt % based on the total weight of the polyether polyol (a1).

7. The composition for manufacturing a polyurethane foam of claim 1, wherein the polyether polyol (b2) is obtainable by steps comprising polymerizing propylene oxide and ethylene oxide, and has a weight average molecular weight of about 3,000 to 8,000 g/mol and a OH value of about 20 to 60 mg KOH/g.

8. A vehicle seat pad prepared by molding the composition for manufacturing a polyurethane foam of claim 1.

9. A vehicle comprising an article prepared with the composition for manufacturing a polyurethane foam of claim 1.

10. A composition for manufacturing a polyurethane foam, comprising:
   an amount of 100 parts by weight of a polyol composition (A),
   an isocyanate composition (B)
   wherein the isocyanate composition (B) is obtainable by a step comprising polymerizing 1) an amount of about 1 to 5 parts by weight of a polyether polyol (b2) with respect to 100 parts by weight of the polyol composition (A) and 2) an isocyanate composition (b1) that comprises i) an amount of about 15 to 40 parts by weight of methylene diphenyl isocyanate (M-MDI) with respect to 100 parts by weight of the polyol composition (A) and ii) an amount of about 8 to 21 parts by weight of polymethylene diphenyl isocyanate (P-MDI) with respect to 100 parts by weight of the polyol composition (A),
   wherein, based on the total weight of polyol composition (A), polyol composition (A) comprises:
   an amount of about 85 to 95 wt % of a polyether polyol (a1); and
   an amount of 5 to 15 wt % of a grafted polymer polyol (a2') in which one or more monomers selected from the group consisting of acrylonitrile and styrene are grafted to a polyether polyol having a weight average molecular weight of 5,000 to 8,000 g/mol and a OH value of 25 to 35 mg KOH/g, and
   wherein the polyether polyol (a1) is obtainable by steps comprising polymerizing propylene oxide (PO) and ethylene oxide (EO), and has a weight average molecular weight of about 6,000 to 8,000 g/mol and a OH value of 20 to 30 mg KOH/g.

\* \* \* \* \*